Patented Aug. 3, 1954

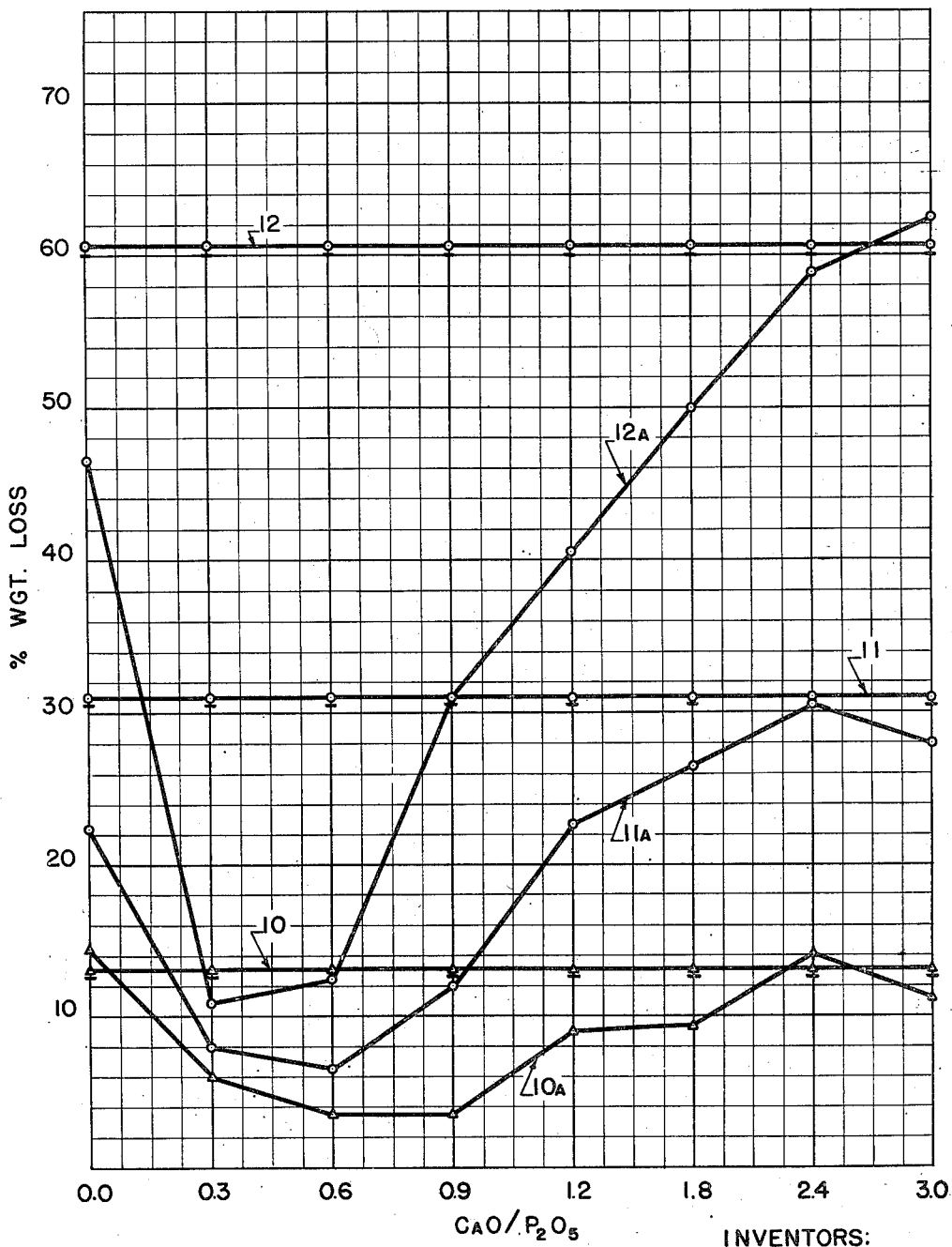

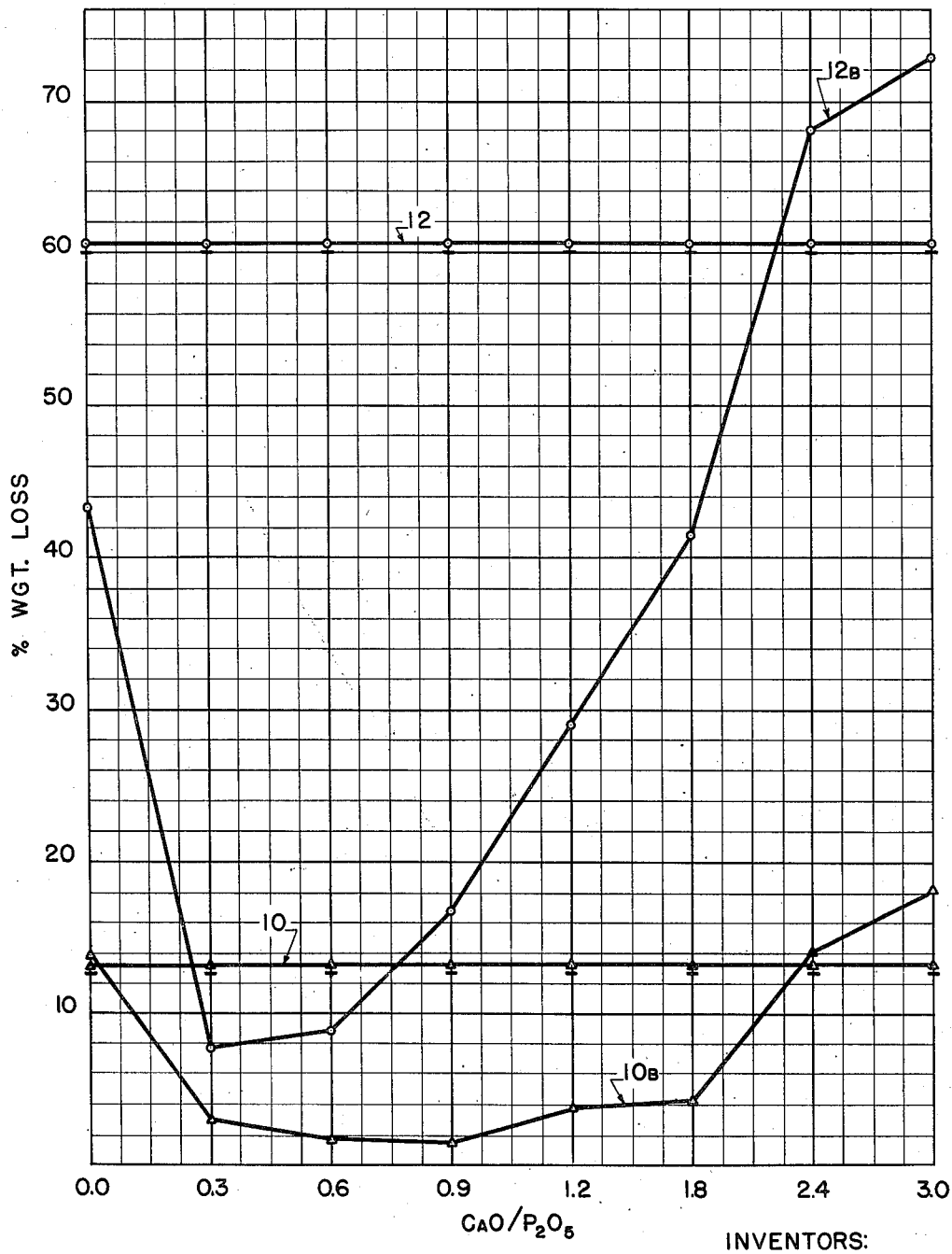

2,685,541

UNITED STATES PATENT OFFICE 2,685,541

REFRACTORY CARBON AND METHOD OF PRODUCING THE SAME

James Woodburn, Jr., Grand Island, and Rawley F. Lynch, Niagara Falls, N. Y., assignors to Great Lakes Carbon Corporation, New York, N. Y., a corporation of Delaware Application March 14, 1952, Serial No. 276,563

26 Claims. (Cl. 117—169)

This invention relates to methods of producing refractory and oxidation-resistant compositions based upon carbon and graphite. More particularly, this invention relates to methods for preparing carbon and graphite bodies containing in the pores thereof calcium phosphate compositions, the resulting material being particularly resistant to oxidation.

The use of massive carbon and graphite bodies as refractory material is of long standing in the art, and the application of such materials for the construction of furnace linings, mold stock for the pouring or casting of molten metals and other hot molten compositions, is progressively increasing. In many of these applications, a major drawback in the use of carbon and graphite resides in the fact that it is not resistant to oxidation, particularly at temperatures in excess of 500° C. This condition is aggravated in the event that the molten or hot composition itself exerts an oxidizing effect upon the carbon; for example, in the casting of fused alumina. Also, the erosion effect of molten metals upon carbon and graphite is quite pronounced, particularly in an oxidizing atmosphere.

Various attempts have been made to improve the properties of carbon and graphite to render it more resistant to oxidation. For example, it has been the practice to impregnate carbon or graphite with carbonaceous material such as tar or pitch from coal or petroleum sources, or with certain natural or synthetic resinous compositions, followed by carbonizing the impregnant. This procedure increases the apparent density of the base carbon body and reduces its porosity. Such techniques have provided only a partial solution to the problem. In addition, they are quite expensive since the impregnated carbon bodies must be again baked to temperatures in excess of the ultimate service temperature of the carbon stock and for some purposes must be regraphitized to temperatures in excess of 2000° C.

It has also been proposed to impregnate carbon or graphite with phosphoric acid. While this reduces the oxidation of carbon or graphite at low temperatures, we have found that such treatment actually catalyzes oxidation at temperatures in excess of 600° C. Again, others have proposed to incorporate refractory materials; for example, compounds of aluminum, calcium, iron, magnesium, such as the phosphate salts of these metals, directly into the "green" mix prior to formation and baking of the carbon bodies. Such compositions are made up of a small amount of refractory, a small amount of carbonaceous binders such as coal tar or coal tar pitch and a major portion of carbon aggregate. Following an intensive mixing operation in order to evenly distribute the carbonaceous binder, the resulting composition is molded or extruded and baked to temperatures of around 1000° C. Although such compositions have been useful in the manufacture of arc-light carbons; we have found that they do not reduce the tendency toward oxidation, particularly at temperatures in excess of 600° C. Presumably, this is for the reason that the refractory material does not form a continuous phase throughout the baked carbon body, but rather is encased or occluded within a carbon matrix which results from thermal decomposition of the carbonaceous binder.

It is an object of this invention to provide methods for the production of materials of construction based upon carbon and graphite.

It is a further object of the invention to provide methods for the production of massive carbon and graphite bodies or articles having improved resistance to erosion by molten metals and to oxidation by the atmosphere or to hot chemicals which normally oxidize carbon or graphite.

It is a further object of the invention to provide methods for the production of mold-construction material based upon carbon and graphite which has marked resistance to oxidation, particularly up to temperatures of about 800° C.

The above objects as well as others which will become apparent upon understanding of the invention as herein described are achieved by impregnating or depositing in the pores of a previously formed massive carbon or graphite body a composition comprising essentially calcium phosphate compound. We have further found that the ratio of $CaO:P_2O_5$ in the calcium phosphate compound impregnant is critical with respect to the ultimate oxidation-resistant properties of the final material. More particularly, we have found that a molar ratio of $CaO:P_2O_5$ in the calcium phosphate compound must be between about 0.1:1 and about 1.8:1.

It should be understood at the outset that our invention contemplates a treatment of various techniques of previously formed, massive, amorphous (or "gas-baked") carbon and/or graphite with solutions which will deposit calcium phosphate compound within the internal and surface pores of the base material as distinguished from adding calcium phosphate to a "green" carbon mix followed by baking, the latter having been previously taught in the art.

We have found that carbon or graphite which contains calcium phosphate compound having the previously mentioned molar ratio of $CaO:P_2O_5$ renders the base material resistant to the action of oxidizing gases and other agents such as fused alumina, to temperatures up to 800° or 850° C. We have found that oxidation of the base carbon or graphite material under such conditions may be reduced from one-fifth to one-tenth of the amount of oxidation which is observed when employing the untreated base material under similar conditions; the improvement is even greater when compared to carbon or graphite bodies which have been treated with phosphoric acid or other refractory materials previously known in the art.

In a broad embodiment of the invention an amorphous carbon or graphite body is at least partially impregnated or treated with a solution of calcium phosphate compound wherein the molar ratio of $CaO:P_2O_5$ is between about 0.1:1 and about 1.8:1. This solution may contain various compounds which will deposit the required calcium phosphate compound upon drying and heating of the resulting treated material; for example, at temperatures from 150° to 500° C. The resulting treated carbon base material is then dried for several hours at about 100° C. followed by a baking operation at temperatures up to 500° C. in order to insure that all of the solvent from the impregnating solution is removed and to decompose hydrated calcium phosphate compounds.

The treatment of carbon or graphite with calcium phosphate compound may be accomplished by various techniques according to our invention. Eminently satisfactory results and prolonged service-life of the final material are achieved by impregnation. This is accomplished by placing the carbon or graphite base material in a container which is subsequently evacuated to about 25–30 inches mercury. After several minutes a solution containing (or capable of forming) calcium phosphate compound is admitted after which the vessel is pressurized to effect partial or total impregnation of the available voids. Ordinarily, a period of 45–120 minutes will be sufficient for this operation. Alternatively, and where complete penetration or impregnation are not essential or necessary, the base carbon or graphite can be coated (as by brushing or spraying) or soaked with solutions which will deposit calcium phosphate compound in the surface and/or sub-surface pores of the carbon or graphite. Alternatively, a combination of the foregoing methods can be employed.

The base carbon (or graphite) materials which are impregnated according to our novel process are adequately described, as to their methods of manufacture and properties, in Mantell, Industrial Carbon, second edition, 1946, particularly in chapters XIII and XVI. The methods of manufacture of the base carbon and graphite materials form no part of this invention. Ordinarily, the amorphous or "gas-baked" carbon which may be treated according to our novel process will have an apparent density (grams/cm.³) of 1.4 to 1.6; the graphitic base material will have an apparent density in excess of 1.4 and preferably 1.6 to 1.8. The higher densities of the graphitic material are achieved by employing pitch impregnated gas-baked carbon which is subsequently graphitized.

In a specific embodiment of the invention, an aqueous solution of calcium phosphate compound wherein the molar ratio of $CaO:P_2O_5$ is between about 0.1:1 and about 1.8:1, and preferably between about 0.3:1 to 0.6:1, is admitted to a previously evacuated vessel containing pieces of massive graphite having an apparent density of about 1.7. The system is then returned to atmospheric pressure and so maintained for 45–120 minutes after which the resulting graphitic pieces are dried at 100° C. for 15 to 20 hours. The dried material is then heated at a temperature of 250° C. for 4 hours to insure that the specimen is completely dry. The resulting composition forms an excellent mold or casting stock in the pouring of fused alumina, glass, pig iron and other molten metals. The active or usual life of such a mold is at least two to three times that of regular graphite.

In preparing the solutions of calcium phosphate compound used in the above embodiment of the invention, the following formulations have been found to be particularly useful:

A. Tri-calcium phosphate — $Ca_3(PO_4)_2$ — plus sufficient oxy acid of phosphorus (preferably o-phosphoric acid) or ammonium salt of a phosphoric acid to insure that the molar ratio of $CaO:P_2O_5$ is between about 0.1:1 and about 1.8:1.

B. Mono calcium phosphate—$Ca(H_2PO_4)_2$—dissolved in aqueous hydrochloric acid.

C. Calcium pyrophosphate—$Ca_2P_2O_7$—dissolved in aqueous hydrochloric acid.

D. Calcium pyrophosphate — $Ca_2P_2O_7$ — dissolved in sufficient o-phosphoric acid or ammonium salt of an oxy acid of phosphorus to insure that the molar ratio of $CaO:PO_2O_5$ is between about 0.1:1 and about 1.8:1.

E. Di calcium phosphate—$CaHPO_4$; tetra calcium orthophosphate—$Ca_4P_2O_9$; deca calcium orthophosphate—$Ca_{10}P_6O_{25}$—dissolved in sufficient o-phosphoric acid or ammonium salt of an oxy acid of phosphorus to insure that the molar ratio of $CaO:P_2O_5$ is between about 0.1:1 and about 1.8:1.

F. Ammonium calcium dimetaphosphate—$(NH_4)Ca(P_2O_6)_2$ dissolved in water or dilute acetic acid.

In addition to the above formulations, the present invention contemplates employing a solution containing calcium halide such as $CaCl_2$, $CaBr_2$, $CaF_2$ or calcium carbonate, oxide or hydroxide, along with at least one agent of the group consisting of the oxy acids of phosphorus, their anhydrides, ammonium salts and mixtures of such phosphatic materials, providing that the molar ratio of $CaO:P_2O_5$ in the solution is between about 0.1:1 and about 1.8:1. The term "oxy acids of phosphorus" include ortho-, pyro- and hypophosphoric acids and the anhydrides of such acids, for example $P_2O_3$, $P_2O_4$, $P_2O_5$ and mixtures thereof. Alternatively, the mono- and dibasic ammonium salts of the above acids and anhydrides can be employed along with the calcium halide. The resulting impregnated carbons contain calcium phosphate compound plus volatile matter such as hydrogen halides, ammonium halides or carbonates and water, which materials can be removed by heating. Depending upon the chemicals employed, the impregnated carbons may contain a solution which, upon heating to a temperature of 150° to 400° C. will deposit calcium phosphate compound in the pores of the carbon body. For example, when the impregnating solution contains calcium chloride and dibasic ammonium phosphate in amounts so that the molar ratio of $CaO:P_2O_5$ is between about 0.1:1 and about 1.8:1, the resulting impregnated carbon must be heated to produce calcium phosphate compound and also to remove water and to form and remove ammonium carbonate.

In a further embodiment of the invention an amorphous carbon or graphite body may be impregnated according to the method mentioned above by employing a "double-impregnation" technique. This involves alternately impregnating the base material with a solution of at least one agent of the group consisting of the oxy acids of phosphorus, their anhydrides, ammonium salts of such phosphatic materials, and mixtures of such phosphatic materials, and another solution containing a calcium salt, preferably a calcium phosphate such as $Ca_3(PO_4)_2$ dissolved in phosphoric acid or alternatively a calcium halide such as $CaCl_2$ which is reactive with the phosphatic agent to form calcium phosphate compound. The relative amounts of impregnating solutions admitted into the pores of the carbon base body are controlled so that the molar ratio of $CaO:P_2O_5$ of the final calcium phosphate compound which is formed therein by interaction between the solutes is between about 0.1:1 and about 1.8:1, and preferably between 0.3:1 and 0.6:1. The various acids of phosphorus, phosphorus anhydrides and ammonium salts of such compositions as hereinbefore set forth are also applicable to this embodiment of the invention. We have found that a solution containing essentially ortho-phosphoric acid and another solution containing calcium phosphate dissolved in hydrochloric acid are particularly effective in practicing this embodiment of the invention.

In practicing the invention in accordance with the "double-impregnation" technique, it is our practice to dry the carbon base material after each impregnation, usually at 100° C. but often at 250° C. prior to conducting the second impregnation which causes deposition of calcium phosphate compound in the pores of the previously impregnated carbon body. The techniques of impregnation involving evacuation and pressurizing of the container are substantially as set forth hereinabove.

In a further embodiment of the invention massive carbon and/or graphite pieces are treated with solutions which will contain (or which will deposit in the pores of the base material under heat treatment) calcium phosphate compound by employing sub-surface treatment techniques. These may involve applying the solutions to the base material by immersion and soaking; by brushing; or by spraying. These treatments will be of sufficient duration, and the solutions in sufficient quantity to apply the solution to the surface or sub-surface portions of the base material in order to deposit therein a desired amount of calcium phosphate compound. The "double-impregnation" technique can also be employed in connection with these procedures, and the carbon base material is usually dried at 100° C. and often at 250° C., between treatment with the individual solutions. While such techniques have been found to be useful for some applications, it will be obvious that the resulting compositions will be effective only as long as the surface or sub-surface remain substantially intact and unexposed to the action of oxidizing agents. For best results and optimum service life, we prefer to employ the previously described impregnation techniques.

In making up the impregnating solutions it is preferable to avoid inclusion therein of alkali metal salts; for example, sodium and potassium chlorides. It is known that sodium and potassium chlorides tend to increase the oxidation rate of carbon and graphite, and while traces or minor quantities of these may be tolerated in our novel compositions, their concentrations should be minimized.

In manufacturing the compositions described herein in accordance with our invention, we contemplate employing one or a plurality of treatments, either with the "single" or "double" impregnation techniques or by spraying or soaking. For example, a solution of calcium phosphate— $Ca_3(PO_4)_2$—dissolved in phosphoric acid to give a molar ratio of $CaO:P_2O_5$ of between about 0.1:1 and about 1.8:1 can be used as the impregnating solution in several treatments of the carbon base material. We have found that two or three impregnations with solutions of calcium phosphate compound result in a refractory carbon-base material which is particularly resistant to prolonged exposure (i. e. over two hours) to an oxidizing atmosphere at temperatures in excess of 700° C. Alternatively, when employing the "double" impregnation technique, a series of alternate impregnations can be conducted using any of the aforementioned phosphatic solutions and calcium salt solutions reactive therewith to deposit calcium phosphate compound in the pores of the carbon body. We have found that it is possible to effect four to five of such "double" impregnations with attendant significant increase in weight of the final, dried composition. Impregnations in excess of this number result in only minute increases in weight and are usually not justified from an economical standpoint.

The amount of calcium phosphate compound (dry basis after heating to 250° C.) deposited in the base material will depend upon the ultimate use of the refractory product. Generally, from one to ten per cent by weight of the compound, based upon the carbon, will suffice.

The expression "calcium phosphate compound" as used herein and in the appended claims is intended to include all of the compounds wherein the ratio of $CaO:P_2O_5$ is within the range of about 0.1:1 and about 1.8:1. The term includes not only such definite compounds as $Ca(H_2PO_4)_2$, $Ca(PO_3)_2$ and $(NH_4)_2Ca(P_2O_6)_2$ and mixtures thereof but also those materials whose chemical structure is not too well established including the calcium phosphate glasses.

In order to further illustrate the compositions and techniques which constitute the present invention, the following examples will be recited:

A series of solutions with various molar ratios of $CaO:P_2O_5$ of from 0.0 (o-phosphoric acid) to 3.0 were prepared using 85% phosphoric acid ($H_3PO_4$) and/or calcium phosphate— $Ca_3(PO_4)_2$—powder and mixtures of these materials. All solutions were prepared to provide a solute concentration of 25% by weight. In some cases it was necessary to increase the acidity of the impregnant to effect solution of calcium phosphate by means of hydrochloric acid. Sections of graphite (1.7 apparent density) were placed in a container which was evacuated to 29 inches' mercury, this condition being maintained for about 45 minutes. The impregnating solution was then admitted to the container in amounts sufficient to cover the graphite, and the system was returned to atmospheric pressure for 45 minutes in the case of a single impregnation and for 120 minutes in the case of two or three impregnations. The resulting impregnated graphite sections were dried at 100° C. for 15–20 hours and then heated at 250° C. for about four hours. We have found it to be essential that the drying operation be conducted rather carefully in order to avoid "sweating" of the graphite sections which results in exudation of the impregnant.

The heated pieces were quartered by machining and subjected to an oxidation test conducted as follows:

The treated graphite along with untreated material is placed in a laboratory muffle furnace on fire clay supports, the furnace having previously been brought up to test temperature. Air is admitted into the furnace at a rate of 2 liters per minute per sample, and the test is conducted for a certain prescribed length of time.

The results of the oxidation tests are set forth in Table I for single and double impregnations of graphite sections:

TABLE I

| Example No. | Molar Ratio $CaO:P_2O_5$ | No. of Impregnations | Percent Oxidation (by weight) at 750° C. | | |
|---|---|---|---|---|---|
| | | | 1 hr. | 2 hrs. | 4 hrs. |
| 1 | 0.0 | 1 | 10.31 | 12.8 | |
| 2 | 0.3 | 1 | 4.07 | 5.03 | |
| 3 | 0.6 | 1 | 2.30 | 4.50 | |
| 4 | 0.9 | 1 | 2.63 | 8.09 | |
| 5 | 1.2 | 1 | 4.10 | 11.35 | |
| 6 | 1.8 | 1 | 8.0 | 24.0 | |
| 7 | 2.4 | 1 | 20.50 | 38.1 | |
| 8 | 3.0 | 1 | 16.69 | 32.75 | |
| 9 | 0.0 | 2 | 14.5 | 22.3 | 46.3 |
| 10 | 0.3 | 2 | 6.02 | 7.98 | 10.93 |
| 11 | 0.6 | 2 | 3.52 | 6.85 | 12.68 |
| 12 | 0.9 | 2 | 3.56 | 12.05 | 31.4 |
| 13 | 1.2 | 2 | 7.75 | 22.7 | 41.0 |
| 14 | 1.8 | 2 | 9.28 | 26.5 | 50.0 |
| 15 | 2.4 | 2 | 14.1 | 30.9 | 59.3 |
| 16 | 3.0 | 2 | 11.15 | 27.9 | 62.3 |
| 17 | 0.0 | 3 | 13.8 | 20.9 | 41.4 |
| 18 | 0.3 | 3 | 3.02 | 5.07 | 7.96 |
| 19 | 0.6 | 3 | 1.63 | 3.78 | 9.18 |
| 20 | 0.9 | 3 | 1.45 | 4.72 | 16.73 |
| 21 | 1.2 | 3 | 3.86 | 14.8 | 29.0 |
| 22 | 1.8 | 3 | 4.15 | 14.7 | 41.6 |
| 23 | 2.4 | 3 | 14.05 | 36.5 | 68.2 |
| 24 | 3.0 | 3 | 18.2 | 43.9 | 72.8 |
| Blank (untreated) | | 3 | 12 | 30 | 63.0 |

In the following examples graphite sections were impregnated two times with solutions containing calcium phosphate—$Ca_3(PO_4)_2$—and o-phosphoric acid (and hydrochloric acid where needed to effect solution). After drying the resulting product at 250° C. for four hours they were tested for resistance to oxidation at 850° C. for one hour previously in the manner described.

TABLE II

| Example No. | Molar Ratio $CaO:P_2O_5$ | Oxidation (percent loss by wt.) |
|---|---|---|
| 25 | 0.0 | 25.6 |
| 26 | 0.3 | 15.6 |
| 27 | 0.6 | 16.0 |
| 28 | 0.9 | 14.7 |
| 29 | 1.2 | 16.1 |
| 30 | 1.8 | 14.7 |
| 31 | 2.4 | 19.6 |
| 32 | 3.0 | 23.1 |
| Blank (untreated) | | 18.5 |

Table III summarizes the amount of solid impregnant (calcium phosphate compound) or phosphoric acid, as the case may be, which was retained in the pores of the graphite after treatment and baking at 250° C.

TABLE III

| Example No. | No. of Impregnations | Percent Increase in Wt. (Ave.) |
|---|---|---|
| 1 | 1 | 6.0 |
| 9 | 2 | 8.2 |
| 17 | 3 | 11.8 |
| 2-8 | 1 | 3.2 |
| 9-16; 25-32 | 2 | 4.5 |
| 17-24 | 3 | 6.8 |

Some of the data in Tables I and II are shown in the drawing where per cent weight loss due to oxidation at 750° C. is plotted aaginst the ratio of $CaO:P_2O_5$:

| Figure No. | Curve No. | Example No. | Oxidation Time (hrs.) |
|---|---|---|---|
| 1 | 10 | Blank | 1 |
| 1 | 11 | Blank | 2 |
| 1 | 12 | Blank | 4 |
| 1 | 10A | 9-16 | 1 |
| 1 | 11A | 9-16 | 2 |
| 1 | 12A | 9-16 | 4 |
| 2 | 10 | Blank | 1 |
| 2 | 12 | Blank | 4 |
| 2 | 10B | 17-24 | 2 |
| 2 | 12B | 17-24 | 4 |

It will be seen from the above data that the amount of oxidation of the treated graphite, particularly where the molar ratio of $CaO:P_2O_5$ is between 0.3:1 and 0.6:1, has been reduced one-fourth to one-tenth that of the untreated material. The data further illustrate the fact that the use of o-phosphoric acid alone or calcium phosphate—$Ca_3(PO_4)_2$—alone actually exert a catalytic effect upon the oxidation rate of graphite.

*Example 33*

A graphite section having an apparent density of 1.7 was impregnated with a saturated solution of dibasic ammonium phosphate—$(NH_4)_2HPO_4$—followed by a drying operation at 100° C. for 12 hours. The resulting piece was then impregnated with a saturated solution of calcium chloride ($CaCl_2$) controlling the degree of saturation by this solution so that the resulting calcium phosphate compound deposited in the pores of the graphite had a molar ratio of $CaO:P_2O_5$ of 0.6:1. After drying and baking as outlined in the previous examples, this material was subjected to air oxidation at 750° C. and the rate of oxidation determined to be about one-tenth that of the untreated material.

*Example 34*

The treatment described in Example 33 was repeated except that ammonium pyro-phosphate was substituted for the dibasic ammonium phosphate. The improvements in oxidation of the treated graphite were of the same order of magnitude.

*Example 35*

A suspension of calcium hydroxide in o-phosphoric acid was prepared and heated to 200° C. A sufficient amount of hydrochloric acid was added to effect solution. The molar ratio of $CaO:P_2O_5$ in this solution was 0.4:1. The resulting solution was employed as an impregnant in accordance with the process described for Examples 1–32. The per cent increase in weight (determined after heating at 250° C.) was about 5% for a single impregnation and about 8% for a double impregnation. The resistance to oxidation of the treated graphite at 750° C. was of the order of that obtained in Examples 2 and 10.

Example 36

A 38% by weight solution of dibasic ammonium phosphate in water and another solution containing 38% by weight of calcium chloride were used as impregnants in treating graphite sections having an apparent density of 1.67. Following the first impregnation with the dibasic ammonium phosphate solution and drying at 100° C. for 12 hours, the resulting piece was impregnated with calcium chloride solution, controlling the amount of saturation by the latter solution so that the molar ratio of $CaO:P_2O_5$ was 0.5:1. Two of these cycles were employed, the pieces being dried at 100° C. after each impregnation. After heating at 250° C. to effect dehydration the treated graphite was tested for resistance to oxidation, the results being as follows (on a comparative basis, a value of 100 being assigned to the oxidation rate of graphite at 750° C.).

TABLE IV

|  | Oxidation (Percent Loss by Weight) | |
|---|---|---|
|  | 750° C. | 800° C. |
| Untreated graphite | 100 | 300 |
| Treated graphite | 20 | 22 |

Example 37

The double impregnation techniques described in Example 36 were used employing as the impregnants 50% solutions of calcium chloride and o-phosphoric acid controlling the gain in weight of the graphite from the impregnants so that in the calcium phosphate compound which results from subsequent heating at a temperature between 150° to 400° C. the ratio of $CaO:P_2O_5$ is about 0.4:1. After heating within the aforementioned temperature range the total gain in weight of the graphite was 4%.

Example 38

Samples of amorphous carbon brick having an apparent density of 1.55 were treated by the "double" impregnation technique employing dibasic ammonium phosphate and calcium chloride solutions as previously described. The final treated bricks, containing 5% by weight of calcium phosphate compound wherein the molar ratio of $CaO:P_2O_5$ was about 0.5:1, were tested for oxidation resistance at 750° C. The results are repeated in Table V.

TABLE V

|  | Oxidation at 750° C.—Percent by weight loss | | | |
|---|---|---|---|---|
|  | 1 hr. | 2 hrs. | 3 hrs. | 4 hrs. |
| Untreated carbon | 12.55 | 21.1 | 27.0 | 31.0 |
| Treated carbon | 2.5 | 9.0 | 5.0 | 21.0 |

In order to further illustrate the improved oxidation characteristics of the novel compositions prepared according to the methods of the invention, sections of amorphous or "gas-baked" carbon were prepared by the techniques set forth in the Mantell reference previously alluded to and containing 5% by weight (based on the carbonaceous ingredients after baking to 950° C.) of (a) calcium phosphate—$Ca_3(PO_4)_2$—(Example 39) and (b) a dried mixture of calcium phosphate—$Ca_3(PO_4)_2$—and o-phosphoric acid—$H_3PO_4$—wherein the ratio of $CaO:P_2O_5$ was 0.6:1 (Example 40). The resulting compositions were baked to 950° C. Oxidation tests were conducted on the resulting samples at 750° C. for one hour and compared with samples of untreated carbon sections and those which had been impregnated after baking with a solution (25% solids) of $Ca_3(PO_4)_2$ in 85% o-phosphoric acid (ratio of $CaO:P_2O_5$ of 0.6:1) in accordance with the invention (Example 41). The results are reported in Table VI.

TABLE VI

| Example No. | Percent Weight Loss |
|---|---|
| Blank (untreated) | 26.7 |
| 39 | 39.6 |
| 40 | 50.0 |
| 41 | 15.7 |

Treated carbon sections from lots representative of Examples 39 and 40 were graphitized by heating to 2200° C. The data on oxidation resistance (at 750° C. for one hour) of the resulting products as compared with untreated graphite stock and graphite impregnated according to the procedure in Example 41 are reported in Table VII.

TABLE VII

| Example No. | Percent Weight Loss |
|---|---|
| Blank (untreated) | 13.5 |
| 39A | 34.5 |
| 40A | 23.3 |
| 41A | 1.24 |

The results in Tables VI and VII show that the addition of $Ca_3(PO_4)_2$ to the green mix actually catalyzes the oxidation of carbon and graphite at high temperatures. They further show that the calcium phosphate compounds contemplated in practicing the present inventions must be placed in the pores of the carbon and graphite which are available after regular processing thereof and cannot be incorporated in the carbonaceous mixture prior to baking or graphitization.

It is to be understood that the above specific examples are recited merely by way of illustration and not by way of limitation. Nor is the invention limited to the specific solutions or combinations of reagents set forth. It should be understood that any combination of solutions which contain or which will form calcium phosphate compounds in the claimed ratio of $CaO:P_2O_5$ either at atmospheric temperatures or pressures or at elevated temperatures or pressures will be employed within the scope of the invention. It should also be understood that volatile acids other than hydrochloric may be employed to effect substantial solution of calcium phosphate compound in the treating solution.

We claim:
1. A method for producing an oxidation-resistant, refractory material which comprises impregnating a carbon body with a composition comprising essentially calcium phosphate compound, the molar ratio of $CaO:P_2O_5$ in said compound being between about 0.1:1 and about 1.8:1.

2. A method for producing an oxidation-resistant, refractory material which comprises placing in the pores of a carbon body a composition comprising essentially calcium phosphate compound, the molar ratio of $CaO:P_2O_5$ in said compound being between about 0.1:1 and about 1.8:1.

3. The method according to claim 2 wherein the molar ratio of $CaO:P_2O_5$ is between about 0.3:1 and about 0.6:1.

4. A method for improving the resistance to oxidation of a graphite body which comprises impregnating said body with a composition comprising essentially calcium phosphate compound, the molar ratio of $CaO:P_2O_5$ in said compound being between about 0.1:1 and about 1.8:1.

5. A method for improving the resistance to oxidation of a body of gas-baked carbon which comprises at least partially impregnating said body with a composition comprising essentially calcium phosphate compound, the molar ratio of $CaO:P_2O_5$ in said compound being between about 0.1:1 and about 1.8:1.

6. The method according to claim 5 wherein the molar ratio of $CaO:P_2O_5$ is between about 0.3:1 and about 0.6:1.

7. A method of improving the resistance to oxidation of a carbon body which comprises impregnating said body with a solution wherein the solute comprises essentially calcium halide and at least one agent of the group consisting of the oxy acids of phosphorus, their anhydrides, their mono- and di-ammonium salts and mixtures thereof, the ratio of $CaO:P_2O_5$ in said solution being between about 0.1:1 and about 1.8:1, and drying the impregnated body to remove substantially all of the solvent therefrom.

8. The method according to claim 7 wherein the calcium halide is calcium chloride and the acid of phosphorus is o-phosphoric acid.

9. The method according to claim 7 wherein the calcium halide is calcium chloride and the ammonium salt of the oxy acid of phosphorus is dibasic ammonium phosphate.

10. A method for improving the resistance to oxidation of a carbon body which comprises alternately impregnating said body with a solution of at least one agent of the group consisting of the oxy acids of phosphorus, their anhydrides, their mono- and di-ammonium salts and mixtures thereof and a solution of a calcium halide to form calcium phosphate compound, the amount of said solutions absorbed by said body being so controlled that the resulting calcium phosphate compound formed in said body has a molar ratio of $CaO:P_2O_5$ of between about 0.1:1 and about 1.8:1, and drying the impregnated body to remove substantially all of the solvent therefrom.

11. The method according to claim 10 wherein the impregnation solutions contain calcium chloride and dibasic ammonium phosphate in a molar ratio of $CaO:P_2O_5$ of between about 0.3:1 and about 0.6:1.

12. The method according to claim 10 wherein the impregnation solutions comprise essentially o-phosphoric acid and calcium phosphate in hydrochloride acid.

13. A method for improving the resistance to oxidation of a carbon body which comprises applying thereto a solution comprising essentially calcium phosphate compound, the molar ratio of $CaO:P_2O_5$ of said compound being between about 0.1:1 and about 1.8:1 and drying said body to remove the solvent therefrom.

14. The method according to claim 13 wherein the molar ratio of $CaO:P_2O_5$ is between about 0.3:1 and about 0.6:1.

15. A method for improving the resistance to oxidation of a carbon body which comprises impregnating said body with a solution consisting essentially of calcium phosphate—$Ca_3(PO_4)_2$—and o-phosphoric acid in a molar ratio of $CaO:P_2O_5$ of between about 0.1:1 and about 1.8:1, and heating the resulting impregnated body to a temperature between about 150 to about 400° C. in order to deposit calcium phosphate compound in the pores of said body.

16. A carbon body of improved resistance to oxidation containing in the pores thereof a composition comprising essentially calcium phosphate compound, the molar ratio of $CaO:P_2O_5$ in said compound being between about 1.1:1 and about 1.8:1.

17. A refractory, oxidation-resistant material consisting of a body of graphite and containing in the pores of said body a composition comprising essentially calcium phosphate compound, the molar ratio of $CaO:P_2O_5$ in said compound being between about 0.1:1 and about 1.8:1.

18. A material according to claim 17 wherein the graphite has an apparent density in the range of 1.6 to 1.8 prior to placing calcium phosphate compound in the pores of the graphite body.

19. A material according to claim 17 wherein the molar ratio of $CaO:P_2O_5$ is between about 0.3:1 and about 0.6:1.

20. A material according to claim 17 wherein the resulting graphitic body contains between about 1.0 and about 10.0% by weight of calcium phosphate compound.

21. A material according to claim 17 wherein the ratio of $CaO:P_2O_5$ is between about 0.3:1 and about 0.6:1, and wherein the resulting graphitic body contains between about 1.0 and about 10.0% by weight of calcium phosphate compound.

22. A refractory, oxidation-resistant material consisting of a body of gas-baked carbon and containing in the pores of said body a composition comprising essentially calcium phosphate compound, the molar ratio of $CaO:P_2O_5$ in said compound being between about 0.1:1 and about 1.8:1.

23. A material according to claim 22 wherein the molar ratio of $CaO:P_2O_5$ is between about 0.3:1 and about 0.6:1.

24. A carbon body containing in the pores thereof a mixture of $Ca(PO_4)_2$ and an oxy acid of phosphorus in amounts so that the molar ratio of $CaO:P_2O_5$ is between about 0.1:1 and about 1.8:1.

25. A material according to claim 24 wherein the molar ratio of $CaO:P_2O_5$ is between about 0.3:1 and about 0.6:1.

26. A carbon body according to claim 24 wherein the oxy acid of phosphorus is o-phosphoric acid.

References Cited in the file of this patent

UNITED STATES PATENTS

| Number | Name | Date |
|---|---|---|
| 1,435,416 | Ottman | Nov. 14, 1922 |
| 1,566,409 | Lavene | Dec. 22, 1925 |
| 2,206,792 | Stalhane | July 2, 1940 |

OTHER REFERENCES

Mellor: A Comprehensive Treatise on Inorganic and Theoretical Chemistry, 1929, volume III, pages 866 and 867.